United States Patent
Liu et al.

(10) Patent No.: US 11,917,735 B2
(45) Date of Patent: Feb. 27, 2024

(54) LED DRIVING SYSTEM AND CLOSED-LOOP CONTROL METHOD FOR LED DRIVING

(71) Applicant: CRM ICBG (WUXI) CO., LTD., Jiangsu (CN)

(72) Inventors: Jun Liu, Jiangsu (CN); Guocheng Li, Jiangsu (CN); Quanqing Wu, Jiangsu (CN)

(73) Assignee: CRM ICBG (WUXI) CO., LTD., Jiangsu (CN)

( * ) Notice: Subject to any disclaimer, the term of this patent is extended or adjusted under 35 U.S.C. 154(b) by 0 days.

(21) Appl. No.: 18/028,208

(22) PCT Filed: Nov. 22, 2021

(86) PCT No.: PCT/CN2021/132142
§ 371 (c)(1),
(2) Date: Mar. 23, 2023

(87) PCT Pub. No.: WO2022/142857
PCT Pub. Date: Jul. 7, 2022

(65) Prior Publication Data
US 2023/0413401 A1    Dec. 21, 2023

(30) Foreign Application Priority Data
Dec. 30, 2020    (CN) .......................... 202011609014.5

(51) Int. Cl.
*H05B 45/345*    (2020.01)
*H05B 45/325*    (2020.01)
*H05B 45/40*    (2020.01)

(52) U.S. Cl.
CPC ......... *H05B 45/345* (2020.01); *H05B 45/325* (2020.01); *H05B 45/40* (2020.01)

(58) Field of Classification Search
CPC ...... H05B 45/10; H05B 45/30; H05B 45/325; H05B 45/345; H05B 45/40; H05B 47/10
See application file for complete search history.

(56) References Cited

U.S. PATENT DOCUMENTS 10,609,773 B1 *    3/2020    Zhou .................... H05B 45/395

FOREIGN PATENT DOCUMENTS

| CN | 108633126 A | 10/2018 |
|---|---|---|
| CN | 108966430 A | 12/2018 |

(Continued)

*Primary Examiner* — Jimmy T Vu
(74) *Attorney, Agent, or Firm* — Global IP Services; Tianhua Gu

(57) ABSTRACT

An LED driving system and a closed-loop control method for LED driving are provided; the LED driving system includes an LED load, a constant-current control module, an electrolytic capacitor, a discharging-voltage measuring module, a bus-voltage measuring module and a charging-current control module, wherein the charging-current control module is connected to an output of the discharging-voltage measuring module, the bus-voltage measuring module and a lower plate of the electrolytic capacitor; the charging current of the electrolytic capacitor is adjusted based on the control signal of the discharging-voltage measuring module and the measured voltage of the bus-voltage measuring module, wherein the charging current of the electrolytic capacitor is reduced by an subtraction operation performed by the addition and subtraction counter, and the charging current of the electrolytic capacitor is increased by an addition operation performed by the addition and subtraction counter.

18 Claims, 2 Drawing Sheets

(56) References Cited

FOREIGN PATENT DOCUMENTS

| | | |
|---|---|---|
| CN | 211606882 U | 9/2020 |
| CN | 113099579 A | 7/2021 |
| CN | 201911339911.6 | 7/2021 |
| CN | 113543411 A | 10/2021 |
| IN | 106165540 A | 11/2016 |
| JP | 2017188380 A | 10/2017 |

* cited by examiner

LED DRIVING SYSTEM AND CLOSED-LOOP CONTROL METHOD FOR LED DRIVING

CROSS REFERENCE TO RELATED PATENT APPLICATION

The present application is the US national stage of PCT/CN2021/132142 filed on 2021 Nov. 22, which claims the priority of the Chinese patent application No. 202011609014.5 filed on 2020 Dec. 30, which application is incorporated herein by reference.

FIELD OF TECHNOLOGY

The present disclosure relates to system design, in particular to an LED driving system and a closed-loop control method for LED driving.

BACKGROUND

With the implementation of the enterprise resource planning (ERP) standard, requirements regarding strobing have been added to the long list of requirements regarding LED driving including power factor (PF), harmonics, efficiency, etc.; as a it result, some new methods of linear LED driving have been invented: one is adding a de-ripple circuit to a traditional linear high-efficiency high-PF driver, or integrating a de-ripple module into a driver chip, as shown in FIG. 1; but since the de-ripple module is relatively complex, and introduces additional efficiency loss, this method is not the best in terms of cost and performance. Another method is separating the module providing constant current to the LED from the module charging and discharging an electrolytic capacitor, and controlling them separately, as shown in FIG. 2; specifically, a second power switch transistor Q2 adopts the traditional linear LED constant current driving, a first power switch transistor Q1 uses measures such as over-voltage-current-drop to control charging and discharging of the electrolytic capacitor Co to achieve a high PF. The charging current of the electrolytic capacitor Co is reduced at peaks of the input voltage, to reduce the charging loss of the first power switch transistor Q1 to improve efficiency; the electrolytic capacitor Co discharges the LED at troughs of the input voltage, to realize a de-strobing function through the LED constant current control of the second power switch transistor Q2. In the scheme shown in FIG. 2, the first power switch transistor Q1 and the second power switch transistor Q2 are in two independent control circuits, and therefore cannot cooperate with each other to achieve the best performance; so when the input voltage is high, the charging time of the first power switch transistor Q1 will increase, causing the charging voltage of the electrolytic capacitor Co to rise, and then the voltage assumed by the drain of the second power switch transistor Q2 (VQ2=VCo−VLED) rises, resulting in loss increase and efficiency reduction; when the input voltage is low, the charging time of the first power switch transistor Q1 will be reduced, resulting in a drop of the charging voltage of the electrolytic capacitor Co, so that the operating voltage of the second power switch transistor Q2 is not high enough, and the LED has a frequency ripple due to sudden current drops.

The above two methods do not adopt closed-loop control systems, and therefore their outputs are substantially affected by changes of input voltages, resulting in a relatively narrow range of input voltages required for normal operations.

Therefore, how to provide a closed-loop control method for LED driving that meets the ERP standard, while simplifying the peripheral circuit, reducing the system cost, and reducing the device area, has become an important technical problem to be solved by the technical personnel in the field.

SUMMARY

The present disclosure provides an LED driving system, including: an LED load, whose positive terminal is connected to a bus voltage; a constant-current control module, connected to a negative terminal of the LED load, and configured for constant-current control of the LED load; an electrolytic capacitor, wherein an upper plate of the electrolytic capacitor is connected to the positive terminal of the LED load, and the electrolytic capacitor discharges to the LED load when the bus voltage is less than a voltage difference across the electrolytic capacitor; a discharging-voltage measuring module, connected to the negative terminal of the LED load, wherein, based on the negative terminal voltage of the LED load, the discharging-voltage measuring module determines a relative magnitude of a discharging voltage of the electrolytic capacitor and obtains a control signal; a bus-voltage measuring module, measuring the bus voltage to obtain a first measured voltage; a charging-current control module, wherein the charging-current control module is connected to the discharging-voltage measuring module, an output of the bus-voltage measuring module, and a lower plate of the electrolytic capacitor, and adjusts a charging current of the electrolytic capacitor based on the control signal and the first measured voltage; wherein the charging-current control module includes a compensation unit, an input of the compensation unit is connected to the discharging-voltage measuring module, and the compensation unit generates a corresponding compensation voltage based on an output signal of the discharging-voltage measuring module; wherein the compensation unit includes an addition and subtraction counter, which decreases the charging current of the electrolytic capacitor by performing a subtraction operation or increases the charging current of the electrolytic capacitor by performing an addition operation.

In an embodiment, the constant-current control module includes a first power switch transistor, a first sampling unit, and a first operational amplifier; a drain of the first power switch transistor is connected to the negative terminal of the LED load, and a source of the first power switch transistor is grounded via the first sampling unit; inputs of the first operational amplifier are connected to the source of the first power switch transistor and a reference voltage, respectively, and an output of the first operational amplifier is connected to a gate of the first power switch transistor; a sampled voltage obtained by the first sampling unit is compared with the reference voltage to control a magnitude of a current flowing through the LED load.

In an embodiment, the constant-current control module further includes a dimming unit connected to the first operational amplifier, wherein the dimming unit receives a dimming control signal, and based on the dimming control signal, adjusts a magnitude of the reference voltage to control an output current of the LED load.

In an embodiment, the dimming control signal is an analog signal or a pulse-width-modulated signal.

In an embodiment, the discharging-voltage measuring module includes a measuring unit and a comparing unit; the measuring unit is connected to the negative terminal of the LED load, and measures a negative terminal voltage of the LED load (i.e., the potential at the negative terminal of the LED load) to obtain a second measured voltage; the comparing unit is connected to the output of the measuring unit and determines the relative magnitude of the discharging voltage of the electrolytic capacitor based on the second measured voltage.

In an embodiment, the comparing unit includes a first comparator and a second comparator; the control signal includes a first control signal or a second control signal; inputs of the first comparator is connected to the second measured voltage and a first preset voltage, respectively, and the first comparator outputs the first control signal when the second measured voltage is greater than the first preset voltage; inputs of the second comparator is connected to the second measured voltage and a second preset voltage, respectively, and the second comparator outputs the second control signal when the second measured voltage is less than the second preset voltage.

In an embodiment, a first input of the addition and subtraction counter is connected to an output of the first comparator, and a second input of the addition and subtraction counter is connected to an output of the second comparator.

In an embodiment, the charging-current control module further includes a second power switch transistor, a second sampling unit, a third sampling unit, and a second operational amplifier, wherein the second power switch transistor has a drain connected to the lower plate of the electrolytic capacitor and a source grounded via the second sampling unit; the second operational amplifier has a first input connected to an output of the compensation unit and a second input connected to an output of the bus-voltage measuring module, and an output of the second operational amplifier is connected to a gate of the second power switch transistor to enable adjustment of the charging current of the electrolytic capacitor; and one terminal of the third sampling unit is connected between the bus-voltage measuring module and the second operational amplifier, and the other terminal of the third sampling unit is connected between the second power switch transistor and the second sampling unit.

In an embodiment, the compensation unit further comprises a compensation-voltage generation circuit and a digital-to-analog conversion (DAC) unit, an output of the addition and subtraction counter is connected to an input of the compensation-voltage generation circuit via the DAC unit, an output of the compensation-voltage generation circuit is connected to the first input of the second operational amplifier.

In an embodiment, the compensation unit further includes a third comparator, wherein the third comparator has a first input connected to the gate of the first power switch transistor, a second input connected to a third preset voltage, and an output connected to a third input of the addition and subtraction counter, wherein when a gate voltage of the first power switch transistor is greater than the third preset voltage, the addition and subtraction counter performs a fast addition operation.

In an embodiment, the compensation unit further includes a protection module; the protection module connects the addition and subtraction counter and the constant-current control module, and adjusts the value of the reference voltage of the constant-current control module based on an overflow signal of the addition and subtraction counter.

In an embodiment, the LED driving system further includes a fourth sampling unit, wherein the fourth sampling unit is connected between the bus-voltage measuring module and the ground, and adjusts an internal control signal of the bus-voltage measuring module.

In an embodiment, the LED driving system also includes an working-voltage generation module, and the working-voltage generation module is connected to the bus voltage and provides a working voltage for the LED driving system based on the bus voltage.

In an embodiment, the LED driving system further includes a rectification module, and the rectification module rectifies an alternating-current power supply to obtain the bus voltage.

The present disclosure further provides a closed-loop control method for LED driving, including: when a bus voltage is less than an on-voltage of an LED load, discharging, by an electrolytic capacitor, to the LED load, and performing, via a constant-current control module, constant-current control on the LED load, wherein when a discharging voltage of the electrolytic capacitor is higher than a first preset voltage, a subtraction operation is performed by an addition and subtraction counter to reduce a charging current of the electrolytic capacitor, and thus reduce the discharging voltage of the electrolytic capacitor; when the discharging voltage of the electrolytic capacitor is lower than a second preset voltage, an addition operation is performed by the addition and subtraction counter to increase the charging current of the electrolytic capacitor, thus increasing the discharging voltage of the electrolytic capacitor; when the bus voltage is greater than the on-voltage of the LED load, supplying the LED load with the bus voltage, and performing constant-current control on the LED load by the constant-current control module, and charging the electrolytic capacitor with the bus voltage; and when the bus voltage is less than a voltage difference cross the electrolytic capacitor, discharging to the LED load by the electrolytic capacitor, and performing constant-current control on the LED load by the constant-current control module.

In an embodiment, when the discharging voltage of the electrolytic capacitor is lower than a third preset voltage, a fast addition operation is performed by the addition and subtraction counter to quickly increase the charging current of the electrolytic capacitor, and thus quickly increase the discharging voltage of the electrolytic capacitor.

In an embodiment, when the addition and subtraction counter generates an addition overflow signal, a reference voltage of the constant-current control module is lowered to lower the output current of the LED load, thus reducing the discharging current of the electrolytic capacitor; when the addition and subtraction counter generates a subtraction overflow signal, the reference voltage of the constant-current control module is raised to increase the output current of the LED load, thus speeding up the discharging of the electrolytic capacitor.

In an embodiment, when the bus voltage is greater than the on-voltage of the LED and greater than a fourth preset voltage, the charging current of the electrolytic capacitor is reduced until it reaches zero.

In summary, the LED driving system and the closed-loop control method for LED driving of the present disclosure adopts the addition and subtraction counter to realize digitalization of loop compensation, eliminating the need for large external compensation capacitors required by traditional loop compensation, simplifying the peripheral circuit, and reducing the system cost The count-overflow feature of the addition and subtraction counter adopted by the present disclosure allows for some additional functions or protection; for example, when the input voltage is low, output dropped currents can still be strobe-free. In addition, the output of the addition and subtraction counter reflects status of the system, and digital signals output by the addition and subtraction counter can be provided to an external microcontroller unit for intelligent processing to achieve more advanced functions such as intelligent dimming.

REFERENCE NUMERALS

Figure 1:
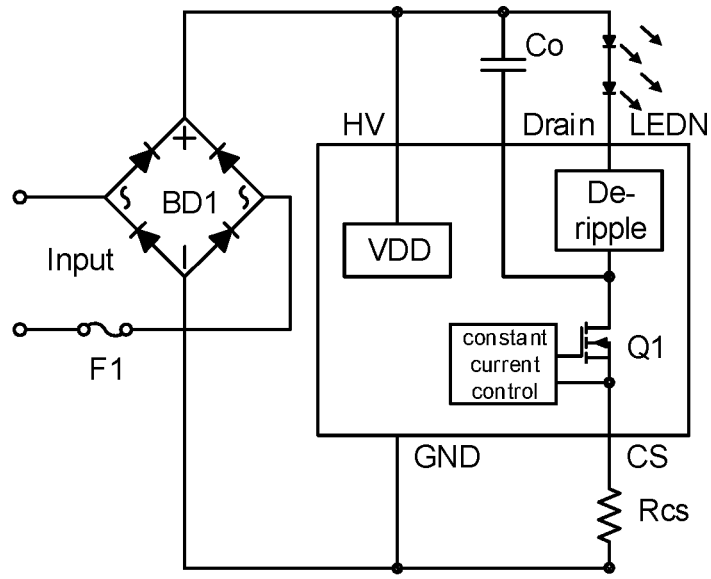
FIG. 1 shows a schematic diagram of a linear LED driving system including a de-ripple module.
Figure 2:
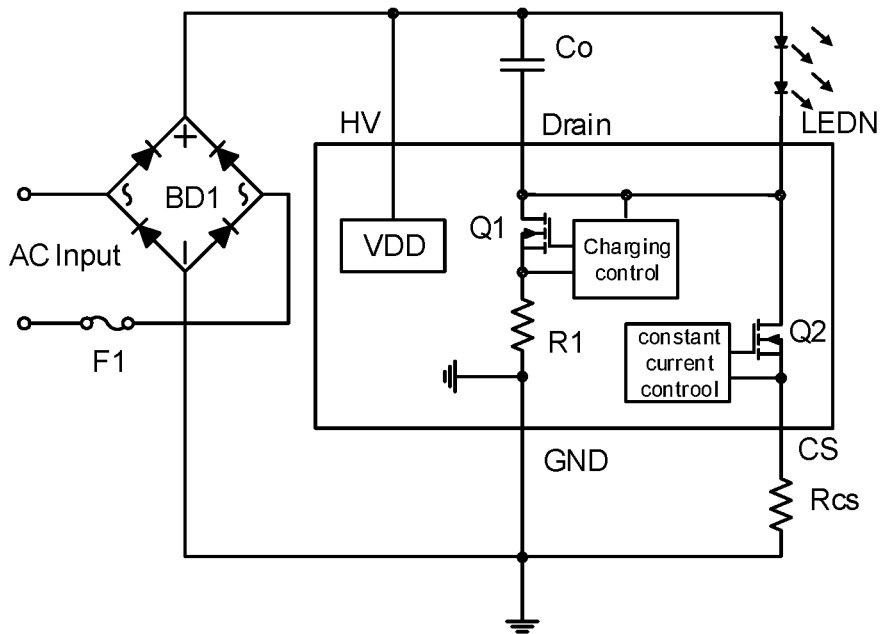
FIG. 2 shows a schematic diagram of an LED driving system where a module providing constant current to the LED is separated from a module charging and discharging an electrolytic capacitor for separate control.

1 LED load
2 Constant-current control module
3 Discharging-voltage measuring module
4 Bus-voltage measuring module
5 Charging-current control module
6 Rectification module
7 Working-voltage generation module

DETAILED DESCRIPTION

The following describes the implementation of the present disclosure through specific examples, and those skilled in the art can easily understand other advantages and effects of the present disclosure from the content disclosed in this specification. The present disclosure can also be implemented or applied through other different specific embodiments. Various details in this specification can also be modified or changed based on different viewpoints and applications without departing from the spirit of the present disclosure.

Figure 3:
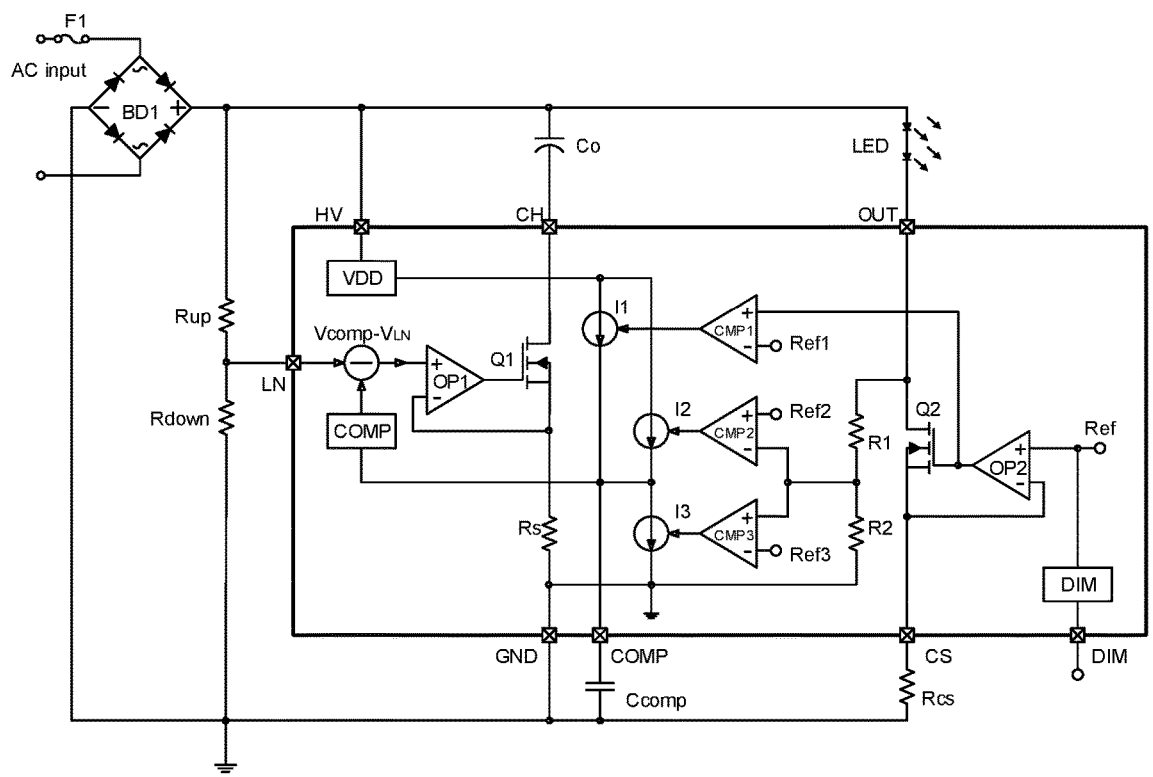
FIG. 3 shows a schematic structural diagram of an LED constant-current driving system that adopts a closed-loop control circuit and includes a large external compensating capacitor.
Figure 4:
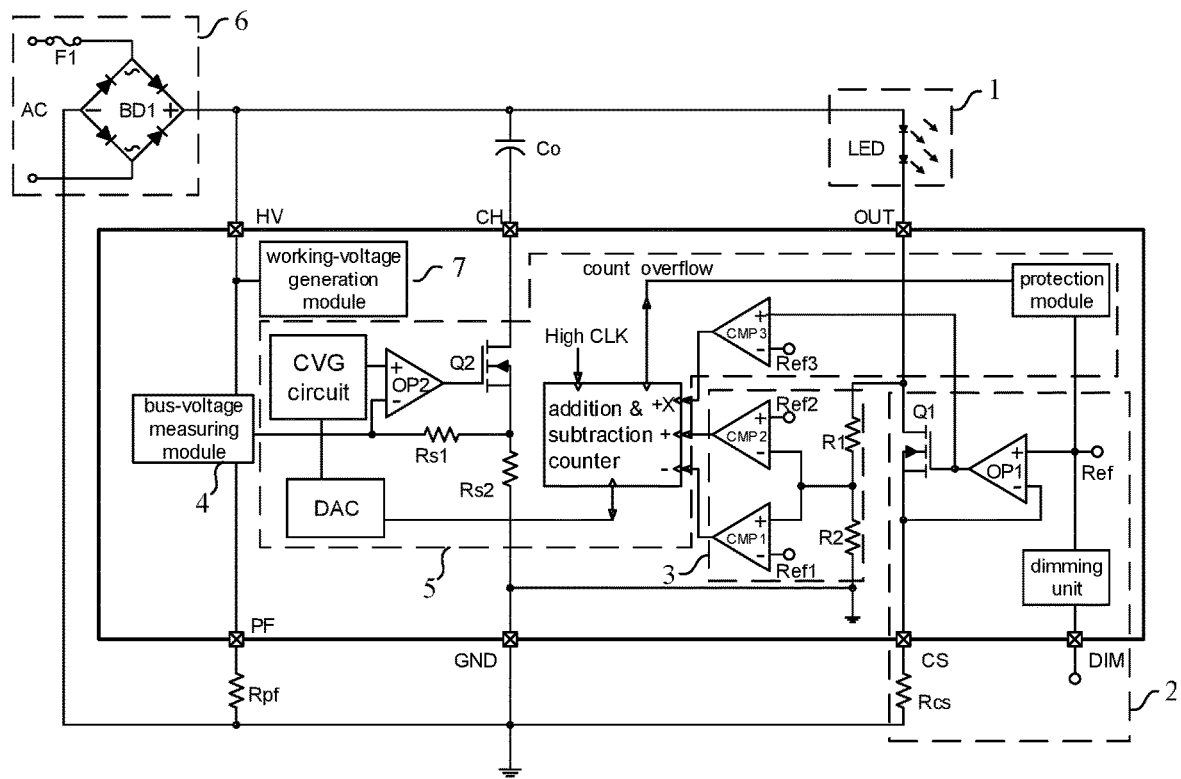
FIG. 4 shows a schematic structural diagram of an LED driving system of the present disclosure.

Refer to FIGS. 3 to 4. It should be noted that the drawings provided in this disclosure only illustrate the basic concept of the present disclosure in a schematic way, so the drawings only show the components related to the present disclosure. The drawings are not necessarily drawn according to the number, shape and size of the components in actual implementation; during the actual implementation, the type, quantity and proportion of each component can be changed as needed, and the components' layout may also be more complicated.

FIG. 3 shows a constant-current LED driving system with a closed-loop control circuit, which controls the charging current of a first power switch transistor Q1 by compensation after measuring a drain voltage of a second power switch transistor Q2, so that an electrolytic capacitor Co is able to maintain the drain voltage of the second power switch transistor Q2 at a suitably low level during discharging so as to reduce the loss of the second power switch transistor Q2, which mitigates strobing while also improving efficiency, and as a result, control loops of the first power switch transistor Q1 and the second power switch transistor Q2 become closed-loop, enlarging the range of input voltages required for normal operations. However, a problem with the LED driving system shown in FIG. 3 is that it requires an additional large capacitor Ccomp for loop compensation in order to establish a closed-loop control circuit, and this external capacitor cannot be integrated inside the chip, thus making the system costly and deducing available space on the PCB board. The present disclosure adopts a new system design to digitize loop compensation by using an addition and subtraction counter, which eliminates the need of a large external compensation capacitor for the compensation loop, simplifying the peripheral circuit and reducing the system cost. Herein, unless otherwise specified, a voltage of an element refers to a potential difference across the element. The technical solution of the present disclosure is described in detail by specific embodiments below.

Embodiment 1

Referring to FIG. 4, embodiment 1 provides an LED driving system, including an LED load 1, a constant-current control module 2, an electrolytic capacitor Co, a discharging-voltage measuring module 3, a bus-voltage measuring module 4 and a charging-current control module 5.

Specifically, a positive terminal of the LED load 1 is connected to a bus voltage Vin. In this embodiment, the bus voltage Vin is provided by a rectification module 6, the rectification module 6 rectifies an alternating-current power source AC to obtain the bus voltage Vin. The rectification module 6 includes a bridge rectifier BD1 and a fuse F1, the bridge rectifier BD1 includes two diode groups connected in parallel, each diode group includes two diodes connected in series, and the alternating-current power source AC is connected between the two diodes of each diode group through the fuse F1. The bus voltage Vin is a rectified voltage obtained by rectificating a sinusoidal voltage. In this embodiment, the LED driving system further includes a working-voltage generation module 7 connected to the bus voltage Vin, providing a working voltage VDD for the LED driving system based on the bus voltage Vin.

As an example, the positive terminal of the LED load 1 is connected to the output of the rectification module 6; the LED load 1 includes a plurality of LED lights connected in series; the LED load 1 can also be a plurality of LED lights that are connected in series and in parallel. When voltages at both terminals of the LED load 1 reach the on-voltage of the LED in the LED load 1, the LED lights up.

Specifically, the constant-current control module 2 is connected to a negative terminal of the LED load 1 for constant-current control of the LED load 1. In this embodiment, the constant-current control module 2 includes a first power switch transistor Q1, a first sampling unit, and a first operational amplifier OP1; the first sampling unit includes, but is not limited to, a first sampling resistor Rcs. After an input voltage passes through the LED load, the first power switch transistor Q1 controls the current flowing through the LED load; the first operational amplifier OP1 measures the voltage different across the first sampling resistor Rcs to perform constant-current control of the LED to ensure the LED current is constant, thereby eliminating strobing.

As an example, a drain of the first power switch transistor Q1 is connected to the negative terminal of the LED load, and a source the first power switch transistor Q1 is grounded via the first sampling resistor Rcs; inputs of the first operational amplifier OP1 is connected to a source of the first power switch transistor Q1 and a reference voltage Ref respectively, and the output of the first operational amplifier OP1 is connected to a gate of the first power switch transistor Q1, and a sampled voltage obtained by the first sampling resistor Rcs is compared with the reference voltage Ref to control the current flowing through the LED load 1, thus realizing constant-current control.

It should be noted that the reference voltage Ref can be a fixed internal value or a value provided by an external source, and when the reference voltage Ref is a fixed internal value, the output current of the LED load 1 can be adjusted by changing the resistance value of the first sampling resistor Rcs. The connections between the inputs and output of the first operational amplifier OP1 can be adjusted, and the same logic relationship can also be achieved by having an inverter.

As an example, the constant-current control module 2 also includes a dimming unit connected to the first operational amplifier OP1, the dimming unit receives an external dimming control signal DIM, and adjusts the amplitude of the reference voltage Ref based on the dimming control signal DIM to configure the output current of the LED load 1, thereby achieving dimming control.

As an example, the dimming control signal DIM includes, but is not limited to, an analog signal or a pulse width modulation (PWM) signal, which is an extended application.

Specifically, the electrolytic capacitor Co has an upper plate connected to the positive terminal of the LED load 1 for discharging to the LED load when the bus voltage Vin is less than the voltage on the electrolytic capacitor Co.

As an example, the upper plate of the electrolytic capacitor Co is connected between the rectification module 6 and the LED load 1, and a lower plate of the electrolytic capacitor Co is connected to the charging-current control module 5; the bus voltage Vin charges the electrolytic capacitor Co when the bus voltage Vin is greater than the voltage VCo on the electrolytic capacitor Co, and supplies power to the LED load 1. When the bus voltage Vin is less than the voltage VCo on the electrolytic capacitor Co, the electrolytic capacitor Co supplies power to the LED load 1.

Specifically, the discharging-voltage measuring module 3 is connected to the negative terminal of the LED load 1, and based on the negative terminal voltage of the LED load 1, it determines the relative magnitude of the discharging voltage of the electrolytic capacitor Co and obtains a control signal.

As an example, the discharging-voltage measuring module 3 includes a measuring unit and a comparing unit; the measuring unit is connected to the negative terminal of the LED load, and measures a negative terminal voltage of the LED load (i.e., the potential at the negative terminal of the LED load) to obtain a second measured voltage; the comparing unit is connected to the output of the measuring unit and determines the relative magnitude of the discharging voltage of the electrolytic capacitor Co based on the second measured voltage.

As an example, the measuring unit includes a first resistor R1 and a second resistor R2, the first resistor R1 and the second resistor R2 are connected in series between the negative terminal of the LED load and ground, and the second measured voltage is obtained by voltage division.

As an example, the comparing unit includes a first comparator CMP1 and a second comparator CMP2.

As an example, an in-phase input of the first comparator CMP1 is connected to the second measured voltage, an inverting input of the first comparator CMP1 is connected to a first preset voltage Ref1, and an output of the first comparator CMP1 outputs a first control signal, wherein when the second measured voltage is greater than the first preset voltage Ref1, the first comparator CMP1 outputs a high level and the first control signal is valid; when the second measured voltage is less than the first preset voltage Ref1, the first comparator CMP1 outputs a low level and the first control signal is invalid.

As an example, the second comparator CMP2 has an inverting input connected to the second measured voltage, and an in-phase input connected to the second preset voltage Ref2, and outputs a second control signal. When the second measured voltage is greater than the second preset voltage Ref2, the second comparator CMP2 outputs a low level and the second control signal is invalid; when the second measured voltage is less than the second preset voltage Ref2, the second comparator CMP2 outputs a high level and the second control signal is valid.

As an example, Ref1 is configured to be greater than Ref2 in order to optimize the system performance.

It should be noted that the connection relationships between inputs and outputs of the first comparator CMP1 and the second comparator CMP2 can be adjusted, and the same logic relationship can be achieved by adding an inverter.

Specifically, the bus-voltage measuring module 4 is connected to the bus voltage Vin, and measures the bus voltage Vin to obtain a first measured voltage.

As an example, the bus-voltage measuring module 4 may include two resistors (not shown) connected in series between the output of the rectification module 6 and ground, to obtain the first measured voltage by voltage division. The bus-voltage measuring module 4 may be integrated inside the chip or may be provided outside the chip.

As an example, the LED driving system may further include a fourth sampling unit (not required), the fourth sampling unit is connected between the bus-voltage measuring module 4 and ground to adjust an internal control signal of the bus-voltage measuring module 4. The fourth sampling unit includes, but is not limited to, a fourth sampling resistor Rpf.

Specifically, the charging-current control module 5 is connected to the discharging-voltage measuring module 3, an output of the bus-voltage measuring module 4, and a lower plate of the electrolytic capacitor Co, and adjusts a charging current of the electrolytic capacitor Co based on the control signal and the first measured voltage;

As an example, the charging-current control module 5 includes a compensation unit, an input of the compensation unit is connected to the discharging-voltage measuring module 3, and the compensation unit generates a corresponding compensation voltage based on an output signal of the discharging-voltage measuring module 3.

As an example, the compensation unit includes an addition and subtraction counter, which decreases the charging current of the electrolytic capacitor by performing a subtraction operation or increases the charging current of the electrolytic capacitor by performing an addition operation.

As an example, the addition and subtraction counter includes a first input (inverting input −), a second input (in-phase input +), a third input (in-phase input +X) and a fourth input (high speed clock High CLK), the first input being connected to the output of the first comparator CMP1 and the second input being connected to the output of the second comparator CMP2.

As an example, the charging-current control module 5 further includes a second power switch transistor Q2, a second sampling unit, a third sampling unit, and a second operational amplifier OP2, wherein a drain of the second power switch transistor Q2 is connected to the lower plate of the electrolytic capacitor Co and a source of the second power switch transistor Q2 is grounded via the second sampling unit. The second sampling unit includes but is not limited to a second sampling resistor Rs2, and the third sampling unit includes but is not limited to a third sampling resistor Rs1.

As an example, the second operational amplifier OP2 has a first input (in-phase input +) connected to an output of the compensation unit and a second input (inverting input −) connected to the output of the bus-voltage measuring module 4, and the output of the second operational amplifier OP2 is connected to a gate of the second power switch transistor Q2 to enable adjustment of the charging current of the electrolytic capacitor Co.

As an example, one terminal of the third sampling unit is connected between the bus-voltage measuring module 4 and the second operational amplifier OP2, and the other terminal of the third sampling unit is connected between the second power switch transistor Q2 and the second sampling unit.

As an example, the compensation unit further includes a compensation-voltage generation (CVG) circuit and a digital-to-analog conversion (DAC) unit, the output of the addition and subtraction counter is connected to an input of the compensation-voltage generation (CVG) circuit via the DAC unit, an output of the compensation-voltage generation (CVG) circuit is connected to the first input (in-phase input +) of the second operational amplifier OP2.

It is to be noted that the connection relationships between the inputs and output of the second operational amplifier OP2 can be adjusted, and the same logical relationship can be achieved by adding an inverter.

Specifically, an exemplary charging-current control process of the electrolytic capacitor Co is roughly as follows: a drain voltage (i.e., the potential at the drain) of the first power switch transistor Q1 in the constant-current control module 2, after voltage division by the first resistor R1 and the second resistor R2, is compared with an internal reference, and then a compensation signal is generated by the addition and subtraction counter; since the voltage at the pin labeled OUT (i.e., the negative terminal voltage of the LED load) is a periodic signal, the addition and subtraction counter will eventually reach an equilibrium state (this equilibrium state will have certain fluctuations, which can be controlled to be within a desired range by setting suitable counting bits and counting frequency); after passing through the DAC unit and the compensation-voltage generation (CVG) circuit, the compensation signal controls the charging and discharging of the electrolytic capacitor Co by the second power switch transistor Q2. The electrolytic capacitor Co ensures that the LED can have electrical currents flowing through it even at troughs of the AC input voltage, and the charging current of the electrolytic capacitor Co is controlled by the second power switch transistor Q2, the second operational amplifier OP2, and the second sampling unit Rs2, thus extending the conduction angle of the corresponding input current to increase the power factor PF. The bus-voltage measuring module 4 measures the bus voltage Vin, and reduces the charging current of the electrolytic capacitor Co until it reaches zero when the bus voltage Vin is too high, thus reducing the loss brought by controlling the second power switch transistor Q2 and improving the overall efficiency of the system, and the magnitude of the internal control signal of the bus-voltage measuring module 4 can be set and adjusted by an external resistor (the fourth sampling resistor Rpf). The current charged into the electrolytic capacitor Co when the AC input voltage is high is later discharged when the AC input voltage is low, thus keeping constant the current output to the LED load. In order to ensure the highest system efficiency, the discharging voltage of the electrolytic capacitor Co cannot be too high; in order to keep constant the current output to the LED, the discharging voltage of the electrolytic capacitor Co cannot be too low either; the relative magnitude of the discharging voltage VCo of the electrolytic capacitor Co can be determined based on the negative terminal voltage VOUT of the LED load (VOUT=VCo−VLED). VOUT is measured by internal voltage-division resistors (e.g., the first resistor R1 and the second resistor R2) and noted as the second measured voltage, and when VOUT is higher than a first internal value (e.g., the first preset voltage Ref1), it means that the discharging voltage of the electrolytic capacitor Co is higher than desired (i.e., the relative magnitude of the discharging voltage is high), at which time the first comparator CMP1 controls the addition and subtraction counter to perform a subtraction operation (equivalent to discharging the compensation capacitor Ccomp shown in FIG. 3), and, after a compensation signal generated by the addition and subtraction counter passes through the DAC unit, the output voltage (i.e., the potential at the output) of the compensation-voltage generation (CVG) circuit is reduced, which reduces the charging current of the electrolytic capacitor Co and thus reduces the discharging voltage of the electrolytic capacitor Co. When VOUT is lower than a second internal value (e.g., the second preset voltage Ref2), it means that the discharging voltage of the electrolytic capacitor Co is lower than desired (i.e., the relative magnitude of the discharging voltage is low), at which time the second comparator CMP2 controls the addition and subtraction counter to perform an addition operation (equivalent to charging the compensation capacitor Ccomp shown in FIG. 3), and, after a compensation signal generated by the addition and subtraction counter passes through the DAC unit, the output voltage of the compensation-voltage generation (CVG) circuit is increased, which increases the charging current of the electrolytic capacitor Co and thus increases the discharging voltage of the electrolytic capacitor Co.

As an example, the compensation unit further includes a third comparator CMP3, the third comparator CMP3 has an in-phase input connected to the gate of the first power switch transistor Q1 and an inverting input connected to a third preset voltage Ref3, and outputs a third control signal; when the gate voltage (i.e., the potential at the gate) of the first power switch transistor Q1 is greater than the third preset voltage Ref3, the third comparator CMP3 outputs a high level, and the third control signal is valid. The output of the third comparator CMP3 is connected to the third input (+X) of the addition and subtraction counter, and when the gate voltage of the first power switch transistor Q1 in the constant-current control module 2 is greater than the third preset voltage Ref3, the addition and subtraction counter performs a fast addition operation.

Specifically, when the discharging voltage of the electrolytic capacitor Co is much lower than desired, the LED current will not be maintained and will fall; at this time, the gate voltage of the first power switch transistor Q1 rises to a relatively high level (especially when the system is just started and the compensation voltage output by the DAC unit is relatively low), and the third comparator CMP3 controls the addition and subtraction counter to perform a fast addition operation (+X) when CMP3 detects that the gate voltage of the first power switch transistor Q1 exceeds a third internal value (e.g., the third preset voltage Ref3), and, after a compensation signal generated by the addition and subtraction counter passes through the DAC unit, the output voltage of the compensation-voltage generation (CVG) circuit is quickly increased and the second power switch transistor Q2 is quickly controlled to increase the charging current of the electrolytic capacitor Co, thereby quickly increasing the discharging voltage of the electrolytic capacitor Co. After loop adjustment by the addition and subtraction counter, it is ensured that the lowest level of VOUT (negative terminal voltage of the LED load), after the LED current is controlled to be constant, is not too high and does not lead to loss of system efficiency.

It should be noted that the connection relationships between the inputs and output of the third comparator CMP3 input can be adjusted, and the same logical relationship can be achieved by adding an inverter.

As an example, the compensation unit further includes a protection module; the protection module connects the addition and subtraction counter and the constant-current control module 2, and adjusts the value of the reference voltage Ref of the constant-current control module 2 based on an overflow signal of the addition and subtraction counter.

Specifically, when the addition and subtraction counter generates an addition overflow signal when adding to a maximum value, it means that VOUT is relatively low, the electrolytic capacitor Co does not store enough energy, and the LED current will not be able to stay constant, at which time, the value of the internal reference (the reference voltage Ref) can be reduced in order to reduce the output current of the LED load, thereby deterring discharging of the electrolytic capacitor Co, increasing VOUT, so that the corresponding loop works normally to ensure that the output current of the LED load is strobe-free. The addition overflow signal is used to reduce the internal reference, so when the input voltage is reduced and the output current is reduced, the control loop can still maintain constant-current operation (less than the rated current), so that the output can be strobe-free, and there will be no frequency ripple and strobing that usually occur in a traditional driver when it cannot maintain its rated current.

When the addition and subtraction counter generates a subtraction overflow signal when subtracting to a minimum value, it means that VOUT is relatively high, and the electrolytic capacitor Co stores too much energy, at which time loss of the second power switch transistor Q2 will increase; in this case, the internal reference can be increased to increase the output current of the LED load, thereby speeding up discharging of the electrolytic capacitor Co, reducing VOUT, so that the corresponding loop works normally, and the loss of the second power switch transistor Q2 is reduced; as a result, the range of input voltages required for normal operations is enlarged.

The LED driving system of this embodiment adopts an addition and subtraction counter to digitize loop compensation and integrates a compensation function realized by an compensation capacitor into the chip, eliminating the need for large external compensation capacitors required by traditional loop compensation, simplifying the peripheral circuit and reducing the system cost. The count-overflow feature of the addition and subtraction counter allows for some additional functions or protection; for example, when the input voltage is low, output dropped currents can still be strobe-free. In addition, the output of the addition and subtraction counter reflects status of the system, and digital signals output by the addition and subtraction counter can be provided to an external micro-controller unit for intelligent processing to achieve more advanced functions such as intelligent dimming.

Embodiment 2

This embodiment provides a closed-loop control method for LED driving, which can be implemented based on the LED driving system in Embodiment 1, other hardware, or software; the method is described below, using the LED driving system in Embodiment 1 as an example.

When the bus voltage is less than the on-voltage of the LED, the electrolytic capacitor discharges to the LED load and performs constant-current control on the LED load via the constant-current control module, wherein when the discharging voltage of the electrolytic capacitor is higher than the first preset voltage, a subtraction operation is performed by the addition and subtraction counter to reduce the charging current of the electrolytic capacitor, and thus reduce the discharging voltage of the electrolytic capacitor; when the discharging voltage of the electrolytic capacitor is lower than the second preset voltage, an addition operation is performed by the addition and subtraction counter to increase the charging current of the electrolytic capacitor, thus increasing the discharging voltage of the electrolytic capacitor.

When the bus voltage is greater than the on-voltage of the LED, the bus voltage supplies power to the LED load and performs constant-current control on the LED load via the constant-current control module, and the bus voltage charges the electrolytic capacitor.

when the bus voltage is less than a voltage difference cross the electrolytic capacitor, discharging to the LED load by the electrolytic capacitor, and performing constant-current control on the LED load by the constant-current control module.

As an example, the negative terminal voltage of the LED load is measured to determine the relative magnitude of the discharging voltage of the electrolytic capacitor.

Specifically, taking the system as shown in FIG. 4 for example, an exemplary charging-current control process of the electrolytic capacitor Co is roughly as follows: a drain voltage of the first power switch transistor Q1 (i.e., the negative terminal voltage of the LED load) in the constant-current control module 2, after voltage division by the first resistor R1 and the second resistor R2, is compared with an internal reference, and then a compensation signal is generated by the addition and subtraction counter; since the voltage at the pin labeled OUT (i.e., the negative terminal voltage of the LED load) is a periodic signal, the addition and subtraction counter will eventually reach an equilibrium state (this equilibrium state will have certain fluctuations, which can be controlled to be within a desired range by setting suitable counting bits and counting frequency); after passing through the DAC unit and the compensation-voltage generation (CVG) circuit, the compensation signal controls the charging and discharging of the electrolytic capacitor Co by the second power switch transistor Q2. The electrolytic capacitor Co ensures that the LED can have electrical currents flowing through it even at troughs of the AC input voltage, and the charging current of the electrolytic capacitor Co is controlled by the second power switch transistor Q2, the second operational amplifier OP2, and the second sampling unit Rs2, thus extending the conduction angle of the corresponding input current to increase the power factor PF. The current charged into the electrolytic capacitor Co when the input voltage is high is discharged at when the input voltage is low, thus keeping constant the current output to the LED load. In order to ensure the highest system efficiency, the discharging voltage of the electrolytic capacitor Co cannot be too high; in order to keep constant the current output to the LED, the discharging voltage of the electrolytic capacitor Co cannot be too low either; the discharging voltage VCo of electrolytic capacitor Co can be determined based on the negative terminal voltage VOUT of the LED load (VOUT=VCo−VLED). VOUT is measured by internal voltage-division resistors (e.g., the first resistor R1 and the second resistor R2), and when VOUT is higher than a first internal value (e.g., the first preset voltage Ref1), it means that the discharging voltage of the electrolytic capacitor Co is higher than desired, at which time the first comparator CMP1 controls the addition and subtraction counter to perform a subtraction operation (equivalent to discharging the compensation capacitor Ccomp shown in FIG. 3), and, after a compensation signal generated by the addition and subtraction counter passes through the DAC unit, the output voltage of the compensation-voltage generation circuit is reduced, which reduces the charging current of the electrolytic capacitor Co and thus reduces the discharging voltage of the electrolytic capacitor Co. When VOUT is lower than a second internal value (e.g., the second preset voltage Ref2), it means that the discharging voltage of the electrolytic capacitor Co is lower than desired, at which time the second comparator CMP2 controls the addition and subtraction counter to perform an addition operation (equivalent to charging the compensation capacitor Ccomp shown in FIG. 3), and, after a compensation signal generated by the addition and subtraction counter passes through the DAC unit, the output voltage of the compensation-voltage generation circuit is increased, which increases the charging current of the electrolytic capacitor Co and thus increases the discharging voltage of the electrolytic capacitor Co.

As an example, when the bus voltage is greater than the on-voltage of the LED and greater than the fourth preset voltage, the charging current of the electrolytic capacitor is reduced until it reaches zero.

Specifically, the bus-voltage measuring module 4 measures the bus voltage Vin, and reduces the charging current of the electrolytic capacitor Co until it reaches zero when the bus voltage Vin is too high, thus reducing the loss brought by controlling the second power switch transistor Q2 and improving the overall efficiency of the system, and the magnitude of the internal control signal of the bus-voltage measuring module 4 can be set and adjusted by an external resistor (the fourth sampling resistor Rpf).

As an example, when the discharging voltage of the electrolytic capacitor Co is lower than the third preset voltage, a fast addition operation is performed by the addition and subtraction counter to quickly increase the charging current of the electrolytic capacitor, and thus quickly increase the discharging voltage of the electrolytic capacitor.

Specifically, when the discharging voltage of the electrolytic capacitor Co is much lower than desired, the LED current will not be maintained and will fall; at this time, the gate voltage of the first power switch transistor Q1 rises to a relatively high level (especially when the system is just started and the compensation voltage output by the DAC unit is relatively low), and the third comparator CMP3 controls the addition and subtraction counter to perform a fast addition operation (+X) when CMP3 detects that the gate voltage of the first power switch transistor Q1 exceeds a third internal value (e.g., the third preset voltage Ref3), and, after a compensation signal generated by the addition and subtraction counter passes through the DAC unit, the output voltage of the compensation-voltage generation circuit is quickly increased and the second power switch transistor Q2 is quickly controlled to increase the charging current of the electrolytic capacitor Co, thereby quickly increasing the discharging voltage of the electrolytic capacitor Co. After loop adjustment by the addition and subtraction counter, it is ensured that the lowest level of VOUT, after the LED current is controlled to be constant, is not too high and does not lead to loss of system efficiency.

In an embodiment, when the addition and subtraction counter generates an addition overflow signal, a reference voltage of the constant-current control module is lowered to lower the output current of the LED load, thus reducing the discharging current of the electrolytic capacitor; when the addition and subtraction counter generates a subtraction overflow signal, the reference voltage of the constant-current control module is raised to increase the output current of the LED load, thus speeding up the discharging of the electrolytic capacitor.

Specifically, when the addition and subtraction counter generates an addition overflow signal when adding to a maximum value, it means that VOUT is relatively low, the electrolytic capacitor Co does not store enough energy, and the LED current will not be able to stay constant, at which time, the value of the internal reference (the reference voltage Ref) can be reduced in order to reduce the output current of the LED load, thereby deterring discharging of the electrolytic capacitor Co, increasing VOUT, so that the loop works normally to ensure that the output current of the LED load is strobe-free. The addition overflow signal is used to reduce the internal reference, so when the input voltage is reduced and the output current is reduced, the control loop can still maintain constant-current operation (with the current smaller than the rated current), so that the output can be strobe-free, and there will be no frequency ripple resulted from sudden current drops and there will be no strobing that usually occur in a traditional driver when it cannot maintain its rated current.

When the addition and subtraction counter generates a subtraction overflow signal when subtracting to a minimum value, it means that VOUT is relatively high, and the electrolytic capacitor Co stores too much energy, at which time loss of the second power switch transistor Q2 will increase; in this case, the internal reference can be increased to increase the output current of the LED load, thereby speeding up discharging of the electrolytic capacitor Co, reducing VOUT, so that the corresponding loop works normally, and the loss of the second power switch transistor Q2 is reduced; as a result, the range of input voltages required for normal operations is enlarged.

The closed-loop control method for LED driving of this embodiment uses the addition and subtraction counter to digitalize loop compensation, eliminating the need for large external compensation capacitors required by traditional loop compensation, simplifying the peripheral circuit and reducing the system cost. The count-overflow feature of the addition and subtraction counter allows for some additional functions or protection; for example, when the input voltage is low, output dropped currents can still be strobe-free. In addition, the output of the addition and subtraction counter reflects status of the system, and digital signals output by the addition and subtraction counter can be provided to an external micro-controller unit for intelligent processing to achieve more advanced functions such as intelligent dimming.

In summary, the LED driving system and the closed-loop control method for LED driving of the present disclosure adopts the addition and subtraction counter to realize digitalization of loop compensation, eliminating the need for large external compensation capacitors required by traditional loop compensation, simplifying the peripheral circuit and reducing the system cost. The count-overflow feature of the addition and subtraction counter adopted by the present disclosure allows for some additional functions or protection; for example, when the input voltage is low, output dropped currents can still be strobe-free. In addition, the output of the addition and subtraction counter reflects status of the system, and digital signals output by the addition and subtraction counter can be provided to an external microcontroller unit for intelligent processing to achieve more advanced functions such as intelligent dimming. Therefore, the present disclosure effectively overcomes various shortcomings of the prior art and has a high value for industrial application.

The above-mentioned embodiments only exemplarily illustrate the principles and effects of the present disclosure, but are not used to limit the present disclosure. Any person skilled in the art may modify or change the above embodiments without violating the spirit and scope of the present disclosure. Therefore, all equivalent modifications or changes made by those skilled in the art without departing from the spirit and technical concepts disclosed by the present disclosure should still be covered by the attached claims of the present disclosure.

What is claimed is:

1. A LED driving system, including:
   an LED load, whose positive terminal is connected to a bus voltage;
   a constant-current control module, connected to a negative terminal of the LED load, and configured for constant-current control of the LED load;
   an electrolytic capacitor, wherein an upper plate of the electrolytic capacitor is connected to the positive terminal of the LED load, and the electrolytic capacitor discharges to the LED load when the bus voltage is less than a voltage difference across the electrolytic capacitor;
   a discharging-voltage measuring module, connected to the negative terminal of the LED load, wherein, based on the negative terminal voltage of the LED load, the discharging-voltage measuring module determines a relative magnitude of a discharging voltage of the electrolytic capacitor and obtains a control signal;
   a bus-voltage measuring module, measuring the bus voltage to obtain a first measured voltage;
   a charging-current control module, wherein the charging-current control module is connected to the discharging-voltage measuring module, an output of the bus-voltage measuring module, and a lower plate of the electrolytic capacitor, and adjusts a charging current of the electrolytic capacitor based on the control signal and the first measured voltage; wherein the charging-current control module includes a compensation unit, an input of the compensation unit is connected to the discharging-voltage measuring module, and the compensation unit generates a corresponding compensation voltage based on an output signal of the discharging-voltage measuring module; wherein the compensation unit includes an addition and subtraction counter, which decreases the charging current of the electrolytic capacitor by performing a subtraction operation or increases the charging current of the electrolytic capacitor by performing an addition operation.

2. The LED driving system according to claim 1, wherein the constant-current control module includes a first power switch transistor, a first sampling unit, and a first operational amplifier; a drain of the first power switch transistor is connected to the negative terminal of the LED load, and a source of the first power switch transistor is grounded via the first sampling unit; inputs of the first operational amplifier are connected to the source of the first power switch transistor and a reference voltage, respectively, and an output of the first operational amplifier is connected to a gate of the first power switch transistor; a sampled voltage obtained by the first sampling unit is compared with the reference voltage to control a magnitude of a current flowing through the LED load.

3. The LED driving system according to claim 2, wherein the constant-current control module further includes a dimming unit connected to the first operational amplifier, wherein the dimming unit receives a dimming control signal, and based on the dimming control signal, adjusts a magnitude of the reference voltage to control an output current of the LED load.

4. The LED driving system according to claim 3, wherein the dimming control signal is an analog signal or a pulse-width-modulated signal.

5. The LED driving system according to claim 1, wherein the discharging-voltage measuring module includes a measuring unit and a comparing unit; the measuring unit is connected to the negative terminal of the LED load, and measures a negative terminal voltage of the LED load to obtain a second measured voltage; the comparing unit is connected to an output of the measuring unit and determines the relative magnitude of the discharging voltage of the electrolytic capacitor based on the second measured voltage.

6. The LED driving system according to claim 5, wherein the comparing unit includes a first comparator and a second comparator; the control signal includes a first control signal or a second control signal; inputs of the first comparator is connected to the second measured voltage and a first preset voltage, respectively, and the first comparator outputs the first control signal when the second measured voltage is greater than the first preset voltage; inputs of the second comparator is connected to the second measured voltage and a second preset voltage, respectively, and the second comparator outputs the second control signal when the second measured voltage is less than the second preset voltage.

7. The LED driving system according to claim 6, wherein a first input of the addition and subtraction counter is connected to an output of the first comparator, and a second input of the addition and subtraction counter is connected to an output of the second comparator.

8. The LED driving system according to claim 1, wherein the charging-current control module further includes a second power switch transistor, a second sampling unit, a third sampling unit, and a second operational amplifier, wherein
   the second power switch transistor has a drain connected to the lower plate of the electrolytic capacitor and a source grounded via the second sampling unit;
   the second operational amplifier has a first input connected to an output of the compensation unit and a second input connected to an output of the bus-voltage measuring module, and an output of the second operational amplifier is connected to a gate of the second power switch transistor to enable adjustment of the charging current of the electrolytic capacitor; and
   one terminal of the third sampling unit is connected between the bus-voltage measuring module and the second operational amplifier, and the other terminal of the third sampling unit is connected between the second power switch transistor and the second sampling unit.

9. The LED driving system according to claim 8, wherein the compensation unit further includes a compensation-voltage generation circuit and a digital-to-analog conversion (DAC) unit, the output of the addition and subtraction counter is connected to an input of the compensation-voltage generation circuit via the DAC unit, an output of the compensation-voltage generation circuit is connected to the first input of the second operational amplifier.

10. The LED driving system according to claim 1, wherein the compensation unit further includes a third comparator, wherein the third comparator has a first input connected to the gate of the first power switch transistor, a second input connected to a third preset voltage, and an output connected to a third input of the addition and subtraction counter, wherein when a gate voltage of the first power switch transistor is greater than the third preset voltage, the addition and subtraction counter performs a fast addition operation.

11. The LED driving system according to claim 1, wherein the compensation unit further includes a protection module; the protection module connects the addition and subtraction counter and the constant-current control module, and adjusts the value of the reference voltage of the constant-current control module based on an overflow signal of the addition and subtraction counter.

12. The LED driving system according to claim 1, wherein the LED driving system further includes a fourth sampling unit, wherein the fourth sampling unit is connected between the bus-voltage measuring module and the ground, and adjusts an internal control signal of the bus-voltage measuring module.

13. The LED driving system according to claim 1, wherein the LED driving system also includes an working-voltage generation module, and the working-voltage generation module is connected to the bus voltage and provides a working voltage for the LED driving system based on the bus voltage.

14. The LED driving system according to claim 1, wherein the LED driving system further includes a rectification module, and the rectification module rectifies an alternating-current power supply to obtain the bus voltage.

15. A closed-loop control method for LED driving, including:
when a bus voltage is less than an on-voltage of an LED load, discharging, by an electrolytic capacitor, to the LED load, and performing, via a constant-current control module, constant-current control on the LED load, wherein when a discharging voltage of the electrolytic capacitor is higher than a first preset voltage, a subtraction operation is performed by an addition and subtraction counter to reduce a charging current of the electrolytic capacitor, and thus reduce the discharging voltage of the electrolytic capacitor; when the discharging voltage of the electrolytic capacitor is lower than a second preset voltage, an addition operation is performed by the addition and subtraction counter to increase the charging current of the electrolytic capacitor, thus increasing the discharging voltage of the electrolytic capacitor;
when the bus voltage is greater than the on-voltage of the LED load, supplying the LED load with the bus voltage, and performing constant-current control on the LED load by the constant-current control module, and charging the electrolytic capacitor with the bus voltage; and
when the bus voltage is less than a voltage difference cross the electrolytic capacitor, discharging to the LED load by the electrolytic capacitor, and performing constant-current control on the LED load by the constant-current control module.

16. The closed-loop control method for LED driving according to claim 15, wherein when the discharging voltage of the electrolytic capacitor Co is lower than a third preset voltage, a fast addition operation is performed by the addition and subtraction counter to quickly increase the charging current of the electrolytic capacitor, and thus quickly increase the discharging voltage of the electrolytic capacitor.

17. The closed-loop control method for LED driving according to claim 15, wherein when the addition and subtraction counter generates an addition overflow signal, a reference voltage of the constant-current control module is lowered to lower the output current of the LED load, thus reducing the discharging current of the electrolytic capacitor; when the addition and subtraction counter generates a subtraction overflow signal, the reference voltage of the constant-current control module is raised to increase the output current of the LED load, thus speeding up the discharging of the electrolytic capacitor.

18. The closed-loop control method for LED driving according to claim 15, wherein when the bus voltage is greater than the on-state voltage of LED load and greater than a fourth preset voltage, the charging current of the electrolytic capacitor is reduced until it is zero.

* * * * *